(12) United States Patent
Cozzetti (10) Patent No.: US 12,255,907 B2
(45) Date of Patent: Mar. 18, 2025

(54) SYSTEMS AND METHODS FOR DYNAMIC NETWORK BAITING

(71) Applicant: Fortinet, Inc., Sunnyvale, CA (US)

(72) Inventor: Hector Agustin Cozzetti, Valbonne (FR)

(73) Assignee: Fortinet, Inc., Sunnyvale, CA (US)

( * ) Notice: Subject to any disclaimer, the term of this patent is extended or adjusted under 35 U.S.C. 154(b) by 225 days.

(21) Appl. No.: 18/093,628

(22) Filed: Jan. 5, 2023

(65) Prior Publication Data
US 2024/0236125 A1   Jul. 11, 2024

(51) Int. Cl.
*H04L 9/40* (2022.01)
(52) U.S. Cl.
CPC ...... *H04L 63/1425* (2013.01); *H04L 63/1433* (2013.01); *H04L 63/205* (2013.01)

(58) Field of Classification Search
CPC ............. H04L 63/1425; H04L 63/1433; H04L 63/205; H04L 63/1408; H04L 63/20
See application file for complete search history.

(56) References Cited

U.S. PATENT DOCUMENTS

| | | | |
|---|---|---|---|
| 10,044,675 B1 * | 8/2018 | Ettema | H04L 63/0227 |
| 10,574,698 B1 * | 2/2020 | Sharifi Mehr | H04L 63/1491 |
| 11,316,895 B1 * | 4/2022 | Wright | H04L 63/1483 |
| 2010/0071051 A1 * | 3/2010 | Choyi | H04L 63/145 726/12 |

* cited by examiner

*Primary Examiner* — Sangseok Park
(74) *Attorney, Agent, or Firm* — Jaffery Watson Hamilton & DeSanctis LLP (57) ABSTRACT

Various embodiments provide systems and methods systems and methods for dynamically attracting malicious network behavior.

19 Claims, 7 Drawing Sheets

SYSTEMS AND METHODS FOR DYNAMIC NETWORK BAITING

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright©2022, Fortinet, Inc.

FIELD

Embodiments discussed generally relate to systems and methods for detecting malicious network behaviors, and more particularly to systems and methods for dynamically attracting malicious network behavior.

BACKGROUND

Malicious actors spend considerable time attempting to identify security lapses in network devices that can be exploited. Where such a malicious actor can be identified, it is possible to create security patches that protect from the actor. However, in many cases, such malicious actors only become known after they have succeeded in attacking a network device. One solution is to create a computer security mechanism configured to detect un-authorized users/actions in business networks, but does not offer any information valuable to a hacker. Such a computer security mechanism in effect operates as a decoy that tempts a malicious actor to expose themselves and their methods without the possibility of losses. Once the malicious actor and their methods are exposed, the information can be used to protect other network device. While such an approach can be useful, the unchanging nature of such computer security mechanisms allows a sophisticated malicious actor an ability to discern the difference from a decoy and a network device from which valuable information can be taken.

Hence, there exists a need in the art for advanced approaches for automatically exposing malicious actors and their methods without exposing valuable information.

SUMMARY

Various embodiments provide systems and methods for dynamically attracting malicious network behavior.

This summary provides only a general outline of some embodiments. Many other objects, features, advantages, and other embodiments will become more fully apparent from the following detailed description, the appended claims and the accompanying drawings and figures.

BRIEF DESCRIPTION OF THE DRAWINGS

A further understanding of the various embodiments may be realized by reference to the figures which are described in remaining portions of the specification. In the figures, similar reference numerals are used throughout several drawings to refer to similar components. In some instances, a sub-label consisting of a lower-case letter is associated with a reference numeral to denote one of multiple similar components. When reference is made to a reference numeral without specification to an existing sub-label, it is intended to refer to all such multiple similar components.

DETAILED DESCRIPTION

Various embodiments provide systems and methods for dynamically attracting malicious network behavior.

Some embodiments of the present disclosure provide bait devices that look like a real production environment. The look of the real production environment is achieved in part because operation of the bait devices are periodically updated to mimic changes monitored in one or more other real production environments. As such, it is substantially more difficult for a malicious actor to discern the difference between a real production environment and the bait device.

Embodiments of the present disclosure include various processes, which will be described below. The processes may be performed by hardware components or may be embodied in machine-executable instructions, which may be used to cause a general-purpose or special-purpose processor programmed with the instructions to perform the steps. Alternatively, processes may be performed by a combination of hardware, software, firmware and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

In the following description, numerous specific details are set forth in order to provide a thorough understanding of embodiments of the present disclosure. It will be apparent to one skilled in the art that embodiments of the present disclosure may be practiced without some of these specific details.

Terminology

Brief definitions of terms used throughout this application are given below.

The terms "connected" or "coupled" and related terms, unless clearly stated to the contrary, are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

As used herein, a "network appliance", a "network element", or a "network device" generally refers to a device or appliance in virtual or physical form that is operable to perform one or more network functions. In some cases, a network appliance may be a database, a network server, or the like. Some network devices may be implemented as general-purpose computers or servers with appropriate software operable to perform the one or more network functions. Other network devices may also include custom hardware (e.g., one or more custom Application-Specific Integrated Circuits (ASICs)). Based upon the disclosure provided herein, one of ordinary skill in the art will recognize a variety of network appliances that may be used in relation to different embodiments. In some cases, a network appliance may be a "network security appliance" or a network security device" that may reside within the particular network that it is protecting, or network security may be provided as a service with the network security device residing in the cloud. For example, while there are differences among network security device vendors, network security devices may be classified in three general performance categories, including entry-level, mid-range, and high-end network security devices. Each category may use different types and forms of central processing units (CPUs), network processors (NPs), and content processors (CPs). NPs may be used to accelerate traffic by offloading network traffic from the main processor. CPs may be used for security functions, such as flow-based inspection and encryption. Entry-level network security devices may include a CPU and no co-processors or a system-on-a-chip (SoC) processor that combines a CPU, a CP and an NP. Mid-range network security devices may include a multi-core CPU, a separate NP Application-Specific Integrated Circuits (ASIC), and a separate CP ASIC. At the high-end, network security devices may have multiple NPs and/or multiple CPs. A network security device is typically associated with a particular network (e.g., a private enterprise network) on behalf of which it provides the one or more security functions. Non-limiting examples of security functions include authentication, next-generation firewall protection, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DoS) detection and mitigation, encryption (e.g., Internet Protocol Secure (IPSec), TLS, SSL), application control, Voice over Internet Protocol (VOIP) support, Virtual Private Networking (VPN), data leak prevention (DLP), antispam, antispyware, logging, reputation-based protections, event correlation, network access control, vulnerability management, and the like. Such security functions may be deployed individually as part of a point solution or in various combinations in the form of a unified threat management (UTM) solution. Non-limiting examples of network security appliances/devices include network gateways, VPN appliances/gateways, UTM appliances (e.g., the FORTIGATE family of network security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), network access control appliances (e.g., FORTINAC family of network access control appliances), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), virtual or physical sandboxing appliances (e.g., FORTISANDBOX family of security appliances), and DoS attack detection appliances (e.g., the FORTIDDOS family of DOS attack detection and mitigation appliances).

The phrase "processing resource" is used in its broadest sense to mean one or more processors capable of executing instructions. Such processors may be distributed within a network environment or may be co-located within a single network appliance. Based upon the disclosure provided herein, one of ordinary skill in the art will recognize a variety of processing resources that may be used in relation to different embodiments.

Example embodiments will now be described more fully hereinafter with reference to the accompanying drawings, in which exemplary embodiments are shown. This disclosure may, however, be embodied in many different forms and should not be construed as limited to the embodiments set forth herein. It will be appreciated by those of ordinary skill in the art that the diagrams, schematics, illustrations, and the like represent conceptual views of processes illustrating systems and methods embodying various aspects of the present disclosure. The functions of the various elements shown in the figures may be provided through the use of dedicated hardware as well as hardware capable of executing associated software and their functions may be carried out through the operation of program logic, through dedicated logic, through the interaction of program control and dedicated logic.

Some embodiments provide methods for automatically modifying a bait network device. The methods include: monitoring, by a processing resource, network traffic associated with a designated network device; identifying, by the processing resource, a set of network traffic features in the network traffic associated with the designated network device; generating, by the processing resource, a set of network traffic instances and a corresponding schedule defining times for each of the network traffic instances in the set of network traffic instances based at least in part on the designated network device; and generating, by the processing resource, network traffic as defined by the set of network traffic instances and the corresponding schedule. In various instances of the aforementioned embodiments, the designated network device is a network security appliance. In some instances of the aforementioned embodiments, the bait network device is a virtual machine running on the designated network device. In yet other embodiments, the bait network device is implemented as a virtual machine running in the cloud as part of a cloud server.

In some instances of the aforementioned embodiments where: the network traffic associated with the designated network device is a first network traffic associated with the designated network device, the set of network traffic features in the network traffic associated with the designated network device, where the set of network traffic instances and the corresponding schedule is a first set of network traffic instances and a first corresponding schedule, the methods further include: monitoring, by the processing resource, a second network traffic associated with the designated network device; identifying, by the processing resource, a second network traffic features in the second network traffic associated with the designated network device; generating, by the processing resource, a second set of network traffic instances and a second corresponding schedule defining times for each of the network traffic instances in the second set of network traffic instances based at least in part on the designated network device; and generating, by the processing resource, network traffic as defined by the second set of network traffic instances and the second corresponding schedule. In some cases, the second network traffic occurs during a time period after a time period during which the first network traffic occurred.

In various instances of the aforementioned embodiments, the methods further include: determining, by the processing resource, that a first parameter has changed on the designated network device; scheduling, by the processing resource, a change in a second parameter on the bait network device after a delay period; and changing, by the processing resource, the second parameter to match the change in the first parameter based upon expiration of the delay period. In some such instances, the first parameter is changed because of a security update on the designated network device. In some cases, a security flaw in the bait network device remains for at least the delay period after the security flaw is corrected in the designated network device. In various such instances, the delay period is user programmable.

In some instances of the aforementioned embodiments, the processing resource includes a first processor and a second processor, and: the monitoring network traffic is done by the first processor; the identifying the set of network traffic features in the network traffic associated with the designated network device is done by the first processor; the generating the set of network traffic instances and the corresponding schedule is done by the first processor; and the generating the network traffic is done by the second processor.

Other embodiments provide systems for automatically modifying operation of a bait network device. The systems include a processing resource, and a non-transient computer readable medium coupled to the processing resource. The non-transient computer readable medium has stored therein instructions that when executed by the processing resource cause the processing resource to: monitor network traffic associated with a designated network device; identify a set of network traffic features in the network traffic associated with the designated network device; generate a set of network traffic instances and a corresponding schedule defining times for each of the network traffic instances in the set of network traffic instances based at least in part on the designated network device; and generate network traffic as defined by the set of network traffic instances and the corresponding schedule.

Yet other embodiments provide non-transient computer readable media having stored therein instructions that when executed by the processing resource cause the processing resource to: monitor a first network traffic associated with a designated network device, wherein the first network traffic occurs during a first period; identify a first set of network traffic features in the first network traffic associated with the designated network device; generate a first set of network traffic instances and a first corresponding schedule defining times for each of the first network traffic instances in the first set of network traffic instances; monitor a second network traffic associated with the designated network device, wherein the second network traffic occurs during a second period; identify a second network traffic features in the second network traffic associated with the designated network device; generate a second set of network traffic instances and a second corresponding schedule defining times for each of the network traffic instances in the second set of network traffic instances based at least in part on the designated network device; generate, during a third period, network traffic as defined by the first set of network traffic instances and the first corresponding schedule; and generate, during a fourth period, network traffic as defined by the second set of network traffic instances and the second corresponding schedule.

Figure 1A:
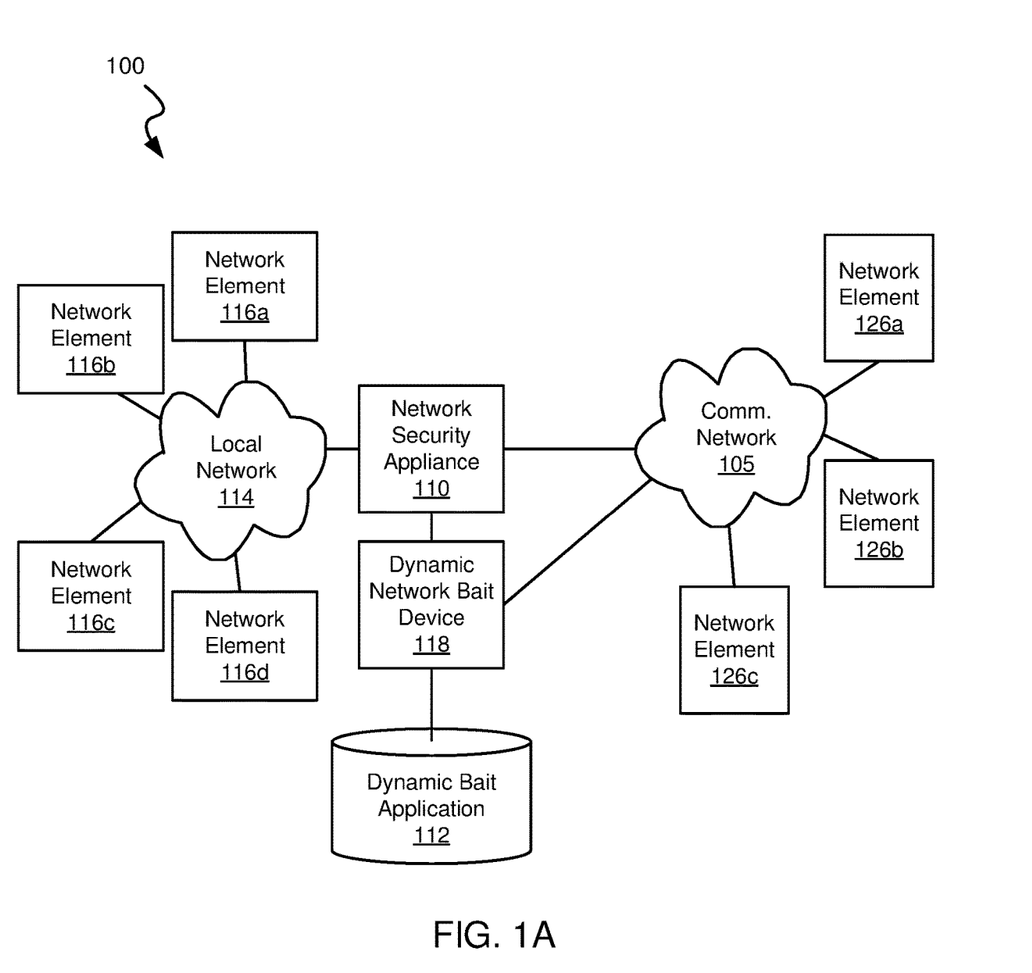
FIGS. 1A-1C illustrate a network architecture including a dynamic network bait device in accordance with some embodiments.

Turning to FIG. 1A, network architecture 100 is shown that includes a dynamic network bait device 118 executing a dynamic bait application 112 in accordance with some embodiments. In the context of network architecture 100, a number of network elements (e.g., a network element 116a, a network element 116b, a network element 116c, a network element 116d, a network element 126a, a network element 126b, and a network element 126c) are coupled to respective networks (e.g., a local network 114 and a communication network 105). Local network 114 and communication network 105 may respectively be any type of communication network known in the art. Those skilled in the art will appreciate that, local network 114 and/or communication network 105 can be wireless network, a wired network, or a combination thereof that can be implemented as one of the various types of networks, such as an Intranet, a Local Area Network (LAN), a Wide Area Network (WAN), an Internet, and the like. Further, local network 114 can either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like.

Access to local network 114 is controlled by a network security appliance 110. Network security appliance 110. Thus, other network elements 126 are capable of accessing local network 114 via network security appliance 110.

Dynamic network bait device 118 is configured to generate network traffic onto communication network 105 that looks similar to the network traffic generated by network security appliance 110. However, access to local network 114 is not accessible via dynamic network bait device 118. As such, dynamic network bait device 118 operates to attract potentially expose malicious actors monitoring communication network 105 and attempting to access network devices without authorization. Operation of dynamic network bait device 118 is governed at least in part by execution of dynamic bait application 112. In some embodiments, dynamic network bait device 118 is implemented as a virtual machine on network security appliance 110. In other embodiments, dynamic network bait device 118 is a stand-alone computer that is provided information about network security appliance 110. In yet other embodiments, the bait network device is implemented as a virtual machine running in the cloud as part of a cloud server. Based upon the disclosure provided herein, one of ordinary skill in the art will recognize a variety of possible deployments of a dynamic network bait device in relation to a network architecture that may be used in relation to different embodiments.

Figure 1B:
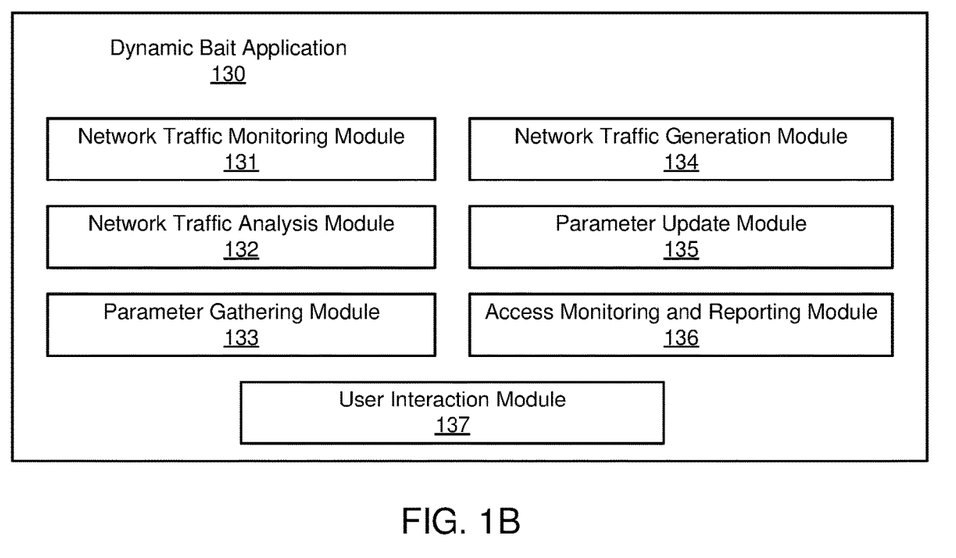

Turning to FIG. 1B, an example implementation of a dynamic bait application 130 (e.g., dynamic network bait device 118 executing dynamic bait application 112) is shown in accordance with some embodiments. As shown in this example, dynamic bait application 130 includes: a network traffic monitoring module 131, a network traffic analysis module 132, a parameter gathering module 133, a network traffic generation module 134, a parameter update module 135, an access monitoring and reporting module 136, and a user interaction module 137.

Network traffic monitoring module 131 is configured to monitor ongoing network traffic. This monitoring may involve using existing tools to gather data on network traffic. Such network tools may include, but are not limited to, Fortinet Security Fabric™ and/or various logs maintained one or more network devices. The monitoring will include gathering information from a number of sections of a network including, but not limited to, a human resources network area, an information technology area, an engineering area, a webservices area, and the like. Based upon the disclosure provided herein, one of ordinary skill in the art will recognize a variety of approaches and/or tools that may be used to monitor and/or gather information regarding network traffic passing to/from a designated mimic device.

Network traffic analysis module 132 is configured to analyze the aforementioned monitored network traffic to identify network traffic features that are to be replicated. The idea is to make the bait network device appear to be similar to the designated mimic device, and thus the analysis of the monitored network traffic is done to yield network traffic features and timing of such features that are exhibited. The patterns of the network traffic are based on statistical analysis on real data and not fixed pre-defined patterns. For example the decoy machines will implement vulnerabilities, but they will be fixed over time like in a real business network. As another example, the bait network device will generate and receive traffic only during working hours (not on weekends) with variance during the day. The network traffic monitoring and analysis thereof to update the network traffic features is continually, or at least periodically, performed such that the bait network device appears to be a living production device and not just a static trap.

As an example, where the network traffic associated with the designated bait device shows an average number of FTP accesses serviced by the designated mimic device between the hours of 8:00 am to 5:00 pm Monday through Friday, the network traffic features can be updated to cause a bait network device to send FTP replies are at rate that varies in time from Monday to Friday between 8:00 am and 5:00 pm, with the variance resulting in an average number corresponding to the average number of FTP accesses serviced by the designated mimic device between the hours of 8:00 am to 5:00 pm Monday through Friday. In contrast, where the network traffic associated with the designated bait device shows an average number of FTP accesses serviced by the designated mimic device between hours outside of the hours of 8:00 am to 5:00 pm Monday through Friday, the network traffic features can be updated to cause a bait network device to send FTP replies are at rate that varies in time during hours outside of Monday to Friday between 8:00 am and 5:00 pm, with the variance resulting in an average number corresponding to the average number of FTP accesses serviced by the designated mimic device outside of the hours of 8:00 am to 5:00 pm Monday through Friday. The aforementioned FTP activity may be one of several behaviors of the designated mimic device that are modeled and replicated in the bait network device. Based upon the disclosure provided herein, one of ordinary skill in the art will recognize a variety of behaviors or a designated mimic device that may be monitored and replicated in accordance with different embodiments.

The identified network traffic features are combined to generate a combination of network traffic instances and a corresponding schedule that is executable by the bait network device to create an appearance similar to that of the designated mimic device (block 306). This generated set of network traffic instances and the corresponding schedule are stored for implementation similar to that discussed above in relation to element 204 of FIG. 2.

Parameter gathering module 133 is configured to periodically access and gather parameters of a designated mimic device. Such parameters are changed as the designated mimic device is changed. As an example, where a security fix is installed on the designated mimic device, that will result in the change of one or more parameters on the network security device.

Network traffic generation module 134 is configured to generate network traffic in accordance with current network traffic instances and a corresponding schedule. Thus, for example, where the real production environment that the dynamic bait device is mimicking exhibits a flurry of emails from a human resources person on Friday from 1:00 pm until 3:00 pm, the current network traffic instances and a corresponding schedule will indicate that a number of emails are to be generated that appear to derive from the human resources person (i.e., the current network traffic instances) on Friday from 1:00 pm until 3:00 pm (i.e., the corresponding schedule). In this case, part of the network traffic generated by the dynamic bait device will include the aforementioned burst of emails according to the current network traffic instances and a corresponding schedule. As another example, where the real production environment that the dynamic bait device is mimicking exhibits a substantial increase in replies generated to file transfer protocol (FTP) accesses at 8:00 am on Monday through Friday and a substantial decrease in replies generated to file transfer protocol (FTP) accesses at 5:00 pm on Monday through Friday, the current network traffic instances and a corresponding schedule will indicate that a first range of replies to FTP requests (i.e., the current network traffic instances) are to be generated between 8:00 am and 5:00 pm Monday through Friday (i.e., the corresponding schedule), and a second, lower range of replies to FTP requests (i.e., the current network traffic instances) are to be generated at other times (i.e., the corresponding schedule). A range is used as the generated traffic will have some time variance added to it so that it appears more realistic. In this case, part of the network traffic generated by the dynamic bait device will include the aforementioned replies to FTP accesses according to the current network traffic instances and a corresponding schedule. The traffic generated by the dynamic bait device will have multiple different traffic types (e.g., emails and/or FTP replies) happening over a given period of time where each of the different traffic types are generated in accordance with a schedule specific to that particular traffic type. Based upon the disclosure provided herein, one of ordinary skill in the art will recognize a variety of current network traffic instances that may be identified by observing real production environment that the dynamic bait device is mimicking, and a schedule controlling the timing for each of the respective traffic types to cause the dynamic bait device to generate network traffic similar to the observed real production environment.

Parameter update module 135 is configured to determine whether gathered parameters have changed when compared with a previously gathered set of parameters to determine if any changes to the parameters have occurred. Where a parameter change has occurred since the last time parameters were gathered, a parameter delay is accessed. The parameter delay is that discussed below in relation to element 206 of FIG. 2. An update of the parameters of the bait network device is scheduled to occur in the future after expiration of the parameter delay. As such, an update to the bait network device is delayed for a defined period (i.e., the parameter delay) after the change is identified in the designated mimic device. Thus, for example, a security flaw that is corrected in the designated mimic device will be similarly corrected in the bait network device, but only after a delay period corresponding to the parameter delay plus any time delay between when the change was made in the designated mimic device and when the parameters are re-gathered by the bait network device. This delayed change in the bait network device allows the bait network device to continue exhibiting a known security flaw for a period, but correct the known security flaw after some time to avoid use of temporal correlation by a malicious actor to identify the bait network device as anything other than a real production environment.

Access monitoring and reporting module 136 is configured to determine whether an attempt to access a bait network device has occurred. As the bait network device is not a real production environment that would be known to and used by legitimate users, a significant percentage of accesses by malicious actors to the bait network device would be expected. As such, recording data about attempted accesses to the bait network device can provide valuable information exposing malicious actors and their behaviors. Where an access attempt is detected, all aspects of the attempted access are recorded and reported to a party responsible for evaluating the attempted accesses.

User interaction module 137 is configured to gather one or more parameters used to define operation of the bait network device. A user may access the dynamic bait device by a user interface supported by user interaction module 137 that allows the user to modify one or more operational parameters. In some cases, user access requires authentication. Based upon the disclosure provided herein, one of ordinary skill in the art will recognize a variety of ways that a user may access the dynamic bait device, and/or a variety of user interfaces that may be provided to facilitate user access in accordance with different embodiments. As the dynamic bait device is adaptively updated based upon behaviors ongoing in a real production environment, a user access to the dynamic bait device may be infrequent or perhaps only once upon deployment. As an example, the real production environment may be network security appliance 110 operating to protect local network 114. Based upon the disclosure provided herein, one of ordinary skill in the art will recognize a variety of real production environments that may be mimicked by a dynamic bait device.

Figure 1C:
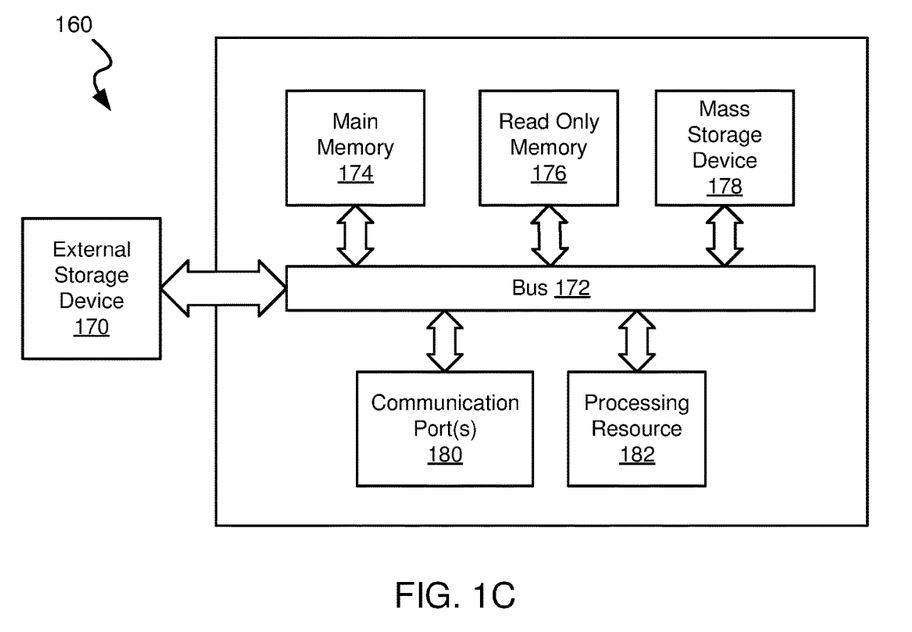

Turning to FIG. 1C, an example computer system 160 is shown in which or with which embodiments of the present disclosure may be utilized. As shown in FIG. 1C, computer system 160 includes an external storage device 170, a bus 172, a main memory 174, a read-only memory 176, a mass storage device 178, one or more communication ports 180, and one or more processing resources (e.g., processing circuitry 182). In one embodiment, computer system 160 may represent some portion of network elements 116, 126, and/or network security appliances 110, 120.

Those skilled in the art will appreciate that computer system 160 may include more than one processing resource 182 and communication port 180. Non-limiting examples of processing resources include, but are not limited to, Intel Quad-Core, Intel i3, Intel i5, Intel i7, Apple M1, AMD Ryzen, or AMD® Opteron® or Athlon MP® processor(s), Motorola® lines of processors, FortiSOC™ system on chip processors or other future processors. Processors 182 may include various modules associated with embodiments of the present disclosure.

Communication port 180 can be any of an RS-232 port for use with a modem-based dialup connection, a 10/100 Ethernet port, a Gigabit, 10 Gigabit, 25G, 40G, and 100G port using copper or fiber, a serial port, a parallel port, or other existing or future ports. Communication port 180 may be chosen depending on a network, such as a Local Area Network (LAN), Wide Area Network (WAN), or any network to which the computer system connects.

Memory 174 can be Random Access Memory (RAM), or any other dynamic storage device commonly known in the art. Read only memory 176 can be any static storage device(s) e.g., but not limited to, a Programmable Read Only Memory (PROM) chips for storing static information e.g., start-up or BIOS instructions for the processing resource.

Mass storage 178 may be any current or future mass storage solution, which can be used to store information and/or instructions. Non-limiting examples of mass storage solutions include Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1300), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 172 communicatively couples processing resource(s) with the other memory, storage and communication blocks. Bus 172 can be, e.g., a Peripheral Component Interconnect (PCI)/PCI Extended (PCI-X) bus, Small Computer System Interface (SCSI), USB or the like, for connecting expansion cards, drives and other subsystems as well as other buses, such as front side bus (FSB), which connects processing resources to software systems.

Optionally, operator and administrative interfaces, e.g., a display, keyboard, and a cursor control device, may also be coupled to bus 172 to support direct operator interaction with the computer system. Other operator and administrative interfaces can be provided through network connections connected through communication port 180. External storage device 190 can be any kind of external hard-drives, floppy drives, IOMEGA® Zip Drives, Compact Disc-Read Only Memory (CD-ROM), Compact Disc—Rewritable (CD-RW), Digital Video Disk-Read Only Memory (DVD-ROM). Components described above are meant only to show various possibilities. In no way should the aforementioned example computer systems limit the scope of the present disclosure.

Figure 2:
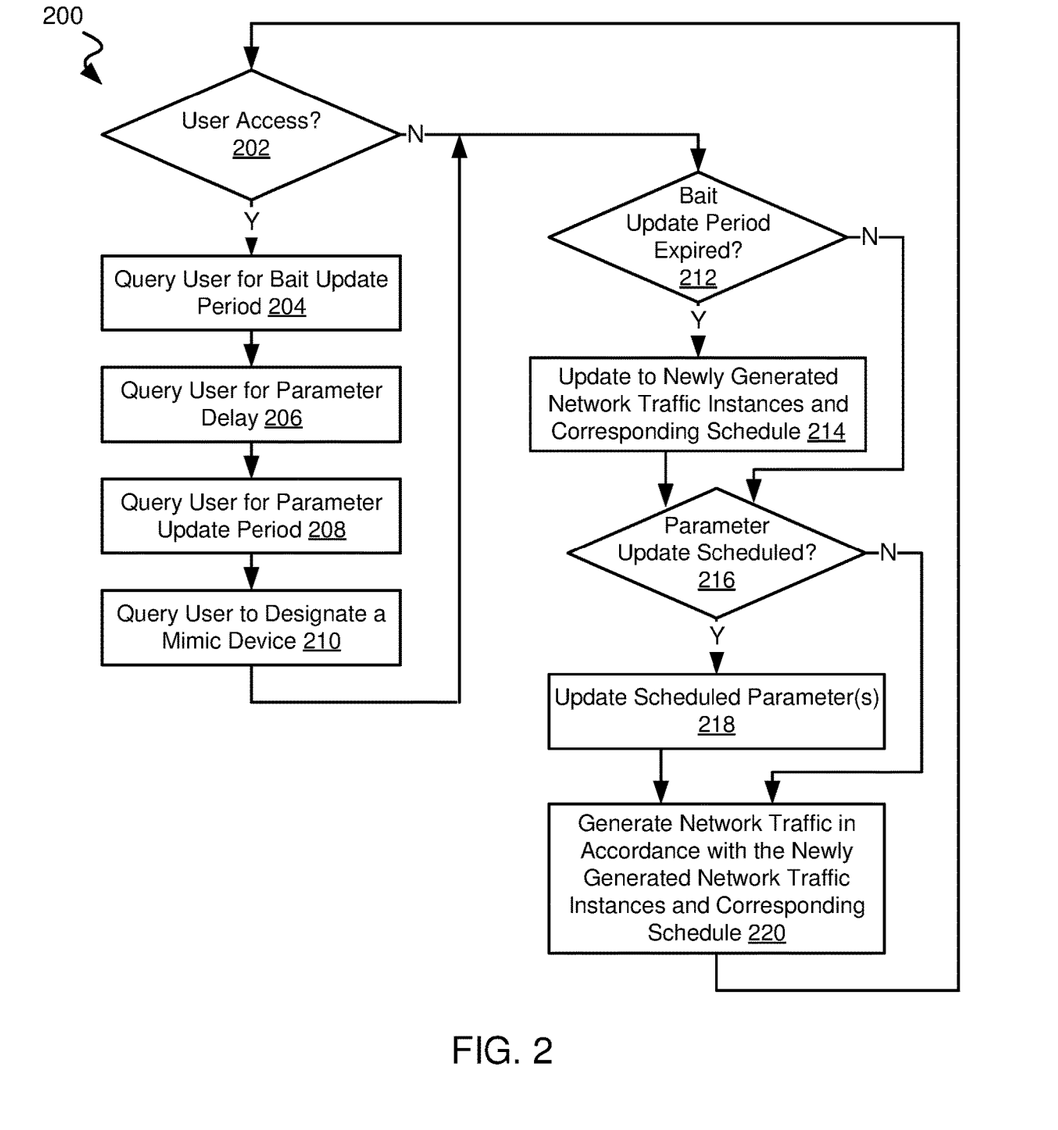
FIG. 2 shows a method in accordance with some embodiments for configuring and adaptively operating a dynamic bait device.

Turning to FIG. 2, a flow diagram 200 shows a method in accordance with some embodiments for configuring and adaptively operating a dynamic bait device. Following flow diagram 200, it is determined whether a user has accessed the dynamic bait device (block 202). The user may access the dynamic bait device by a user interface that allows the user to modify one or more operational parameters. In some cases, user access requires authentication. Based upon the disclosure provided herein, one of ordinary skill in the art will recognize a variety of ways that a user may access the dynamic bait device, and/or a variety of user interfaces that may be provided to facilitate user access in accordance with different embodiments. As the dynamic bait device is adaptively updated based upon behaviors ongoing in a real production environment, a user access to the dynamic bait device may be infrequent or perhaps only once upon deployment. As an example, the real production environment may be network security appliance 110 operating to protect local network 114. Based upon the disclosure provided herein, one of ordinary skill in the art will recognize a variety of real production environments that may be mimicked by a dynamic bait device.

Where it is determined that a user has accessed the dynamic bait device (block 202), the user is queried for: a bait update period (block 204), a parameter delay (block 206), a parameter update frequency (block 208), and a designated mimic device 210). The designated mimic device indicates a real production environment that the dynamic bait device is expected to mimic. It is noted that while this embodiment is described as querying a user for the for specified parameters that fewer or more parameters may be requested and/or obtained in relation to different embodiments depending upon the particular implementation.

The bait update period defines a time period over which the dynamic bait device will operate using a network traffic features before updating the network traffic features to reflect changes in a real production environment that the dynamic bait device is mimicking. In one embodiment, the bait update period is not user selectable and is set at two weeks.

The parameter delay defines a time delay between when a parameter update is detected in a real production environment that the dynamic bait device is mimicking and when that parameter update will be reflected in the dynamic bait device. Thus, as an example, where a security patch is applied to the real production environment resulting in a change to one or more parameters of the real production environment, those parameter changes will be reflected in the dynamic bait device after expiration of the parameter delay. Such a delay allows the dynamic bait device to continue to appear vulnerable to known security flaws, but to eventually update to avoid appearing like a decoy. In one embodiment, the parameter delay is not user selectable and is set at ten days.

The parameter update period is a time period between access to parameters of a real production environment that the dynamic bait device is mimicking. In some embodiments, such parameter changes are pushed from the real production environment to the dynamic bait device, and thus this parameter is not needed. In various embodiments, parameter update period is not user selectable and is set at one day.

Where, alternatively, no user access has occurred (block 202), it is determined whether the bait update period has expired (block 212). This may be determined by a timer that is sets an expiration flag each time the bait update period has passed, and then starts timing the next period. Where the bait update period has expired (block 212), newly generated network traffic instances are updated to the dynamic bait device (block 214). In some embodiments, the newly generated network traffic instances are generated in accordance with the method discussed below in relation to FIG. 3. Such an update to the newly generated network traffic results in the dynamic bait device adaptively updating network traffic that it is generating to reflect what was recently learned from the real production environment that the dynamic bait device is mimicking. By automatically updating the network traffic generated by the dynamic bait device, it is harder for a malicious actor to discern that the dynamic bait device is a decoy.

It is determined whether a parameter update is scheduled (block 216). A parameter update is scheduled whenever a parameter update is detected in the real production environment that the dynamic bait device is mimicking, and is scheduled for the current time plus the parameter update delay. In some embodiments, parameter updates are scheduled similar to the method discussed in relation to FIG. 4. Where a parameter update is scheduled (block 216), one or more parameters indicated in the scheduled parameter update are modified in the dynamic bait device (block 218). As mentioned above, delaying update of a parameter allows the dynamic bait device to appear vulnerable for a limited time, but not so long as to alert a malicious actor to the decoy nature of the bait device.

The dynamic bait device generates network traffic in accordance with current network traffic instances and a corresponding schedule (block 220). Thus, for example, where the real production environment that the dynamic bait device is mimicking exhibits a flurry of emails from a human resources person on Friday from 1:00 pm until 3:00 pm, the current network traffic instances and a corresponding schedule will indicate that a number of emails are to be generated that appear to derive from the human resources person (i.e., the current network traffic instances) on Friday from 1:00 pm until 3:00 pm (i.e., the corresponding schedule). In this case, part of the network traffic generated by the dynamic bait device will include the aforementioned burst of emails according to the current network traffic instances and a corresponding schedule. As another example, where the real production environment that the dynamic bait device is mimicking exhibits a substantial increase in replies generated to file transfer protocol (FTP) accesses at 8:00 am on Monday through Friday and a substantial decrease in replies generated to file transfer protocol (FTP) accesses at 5:00 pm on Monday through Friday, the current network traffic instances and a corresponding schedule will indicate that a first range of replies to FTP requests (i.e., the current network traffic instances) are to be generated between 8:00 am and 5:00 pm Monday through Friday (i.e., the corresponding schedule), and a second, lower range of replies to FTP requests (i.e., the current network traffic instances) are to be generated at other times (i.e., the corresponding schedule). A range is used as the generated traffic will have some time variance added to it so that it appears more realistic. In this case, part of the network traffic generated by the dynamic bait device will include the aforementioned replies to FTP accesses according to the current network traffic instances and a corresponding schedule. The traffic generated by the dynamic bait device will have multiple different traffic types (e.g., emails and/or FTP replies) happening over a given period of time where each of the different traffic types are generated in accordance with a schedule specific to that particular traffic type. Based upon the disclosure provided herein, one of ordinary skill in the art will recognize a variety of current network traffic instances that may be identified by observing real production environment that the dynamic bait device is mimicking, and a schedule controlling the timing for each of the respective traffic types to cause the dynamic bait device to generate network traffic similar to the observed real production environment.

Figure 3:
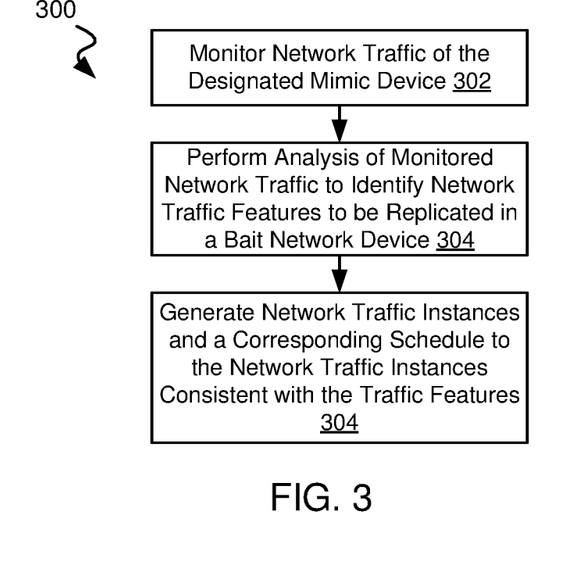
FIG. 3 shows a method in accordance with various embodiments for automatically configuring a realistic feeling operation for a dynamic bait device.

Turning to FIG. 3, a flow diagram 300 shows a method in accordance with various embodiments for automatically configuring a realistic feeling operation for a dynamic bait device. Following flow diagram 300, network traffic to/from a designated mimic device is monitored (block 302). This monitoring may involve using existing tools to gather data on network traffic. Such network tools may include, but are not limited to, Fortinet Security Fabric™ and/or various logs maintained one or more network devices. The monitoring will include gathering information from a number of sections of a network including, but not limited to, a human resources network area, an information technology area, an engineering area, a webservices area, and the like. Based upon the disclosure provided herein, one of ordinary skill in the art will recognize a variety of approaches and/or tools that may be used to monitor and/or gather information regarding network traffic passing to/from a designated mimic device.

As described above in relation to FIG. 2, the designated mimic device is selected by a user and indicates a real production environment that the dynamic bait device is expected to mimic. As an example, the designated mimic device may be a network security appliance configured to protect a particular network. As another example, the designated mimic device may be a server offering access to a particular database on a network. Based upon the disclosure provided herein, one of ordinary skill in the art will recognize a variety of a real production environments that may be selected as the designated mimic device in accordance with different embodiments.

An analysis of the monitored network traffic is performed to identify network traffic features that are to be replicated (block 304). The idea is to make the bait network device appear to be similar to the designated mimic device. The bait network device thus generates traffic similar to that of the designated mimic device with the network traffic traversing networks and exposing services allegedly provided by the bait network device. The patterns of the network traffic are based on statistical analysis on real data and not fixed pre-defined patterns. For example the decoy machines will implement vulnerabilities, but they will be fixed over time like in a real business network. As another example, the bait network device will generate and receive traffic only during working hours (not on weekends) with variance during the day. The network traffic monitoring and analysis thereof to update the network traffic features is continually, or at least periodically, performed such that the bait network device appears to be a living production device and not just a static trap.

The bait network device is made to appear to be similar to the designated mimic device by generating patterns of that match, for example, traffic-over-time (i.e., a volume of traffic that varies as a function of time during a given week), interactions-over-time (i.e., a volume of interactions with the designated mimic device that varies as a function of time during a given week), services-over-time (i.e., a volume of responses to requests for a particular service that varies as a function of time during a given week), and/or, users-and-devices-over-time (i.e., a number of different users and/or devices responded to by the bait network device that varies as a function of time during a given week) as exhibited in the network traffic monitored from the designated mimic device. In some cases, the aforementioned data may be used as training data in a machine learning algorithm configured to automatically modify the monitored data over time to yield a generalized predictive pattern for a network device. In the end, the analysis yields the network features which are set of actions that are to be performed by a bait network device according to a defined schedule. Such network features (performed in accordance with the schedule) are in effect a recipe for what network behaviors to be performed by a bait network device to appear similar to the designated mimic device.

As an example, where the network traffic associated with the designated bait device shows an average number of FTP accesses serviced by the designated mimic device between the hours of 8:00 am to 5:00 pm Monday through Friday, the network traffic features can be updated to cause a bait network device to send FTP replies are at rate that varies in time from Monday to Friday between 8:00 am and 5:00 pm, with the variance resulting in an average number corresponding to the average number of FTP accesses serviced by the designated mimic device between the hours of 8:00 am to 5:00 pm Monday through Friday. In contrast, where the network traffic associated with the designated bait device shows an average number of FTP accesses serviced by the designated mimic device between hours outside of the hours of 8:00 am to 5:00 pm Monday through Friday, the network traffic features can be updated to cause a bait network device to send FTP replies are at rate that varies in time during hours outside of Monday to Friday between 8:00 am and 5:00 pm, with the variance resulting in an average number corresponding to the average number of FTP accesses serviced by the designated mimic device outside of the hours of 8:00 am to 5:00 pm Monday through Friday. The aforementioned FTP activity may be one of several behaviors of the designated mimic device that are modeled and replicated in the bait network device. Based upon the disclosure provided herein, one of ordinary skill in the art will recognize a variety of behaviors or a designated mimic device that may be monitored and replicated in accordance with different embodiments.

The identified network traffic features are combined to generate a combination of network traffic instances and a corresponding schedule that is executable by the bait network device to create an appearance similar to that of the designated mimic device (block 306). The set of network traffic instances and the corresponding schedule define the operation of a bait network device that is similar to that of the designated mimic device. This generated set of network traffic instances and the corresponding schedule are stored for implementation similar to that discussed above in relation to element 204 of FIG. 2.

Figure 4:
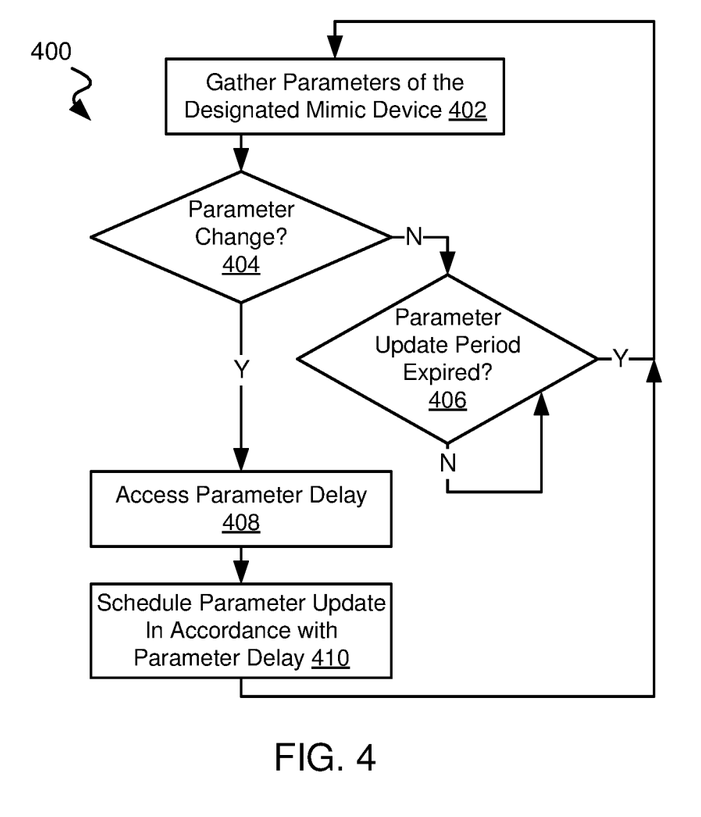
FIG. 4 shows a method in accordance for automatically configuring a parameter update of a dynamic bait device.

Turning to FIG. 4, a flow diagram 400 shows a method in accordance for automatically configuring a parameter update of a dynamic bait device. Following flow diagram 400, parameters of the designated mimic device are gathered (block 402). Such parameters are changed as the designated mimic device is changed. As an example, where a security fix is installed on the designated mimic device, that will result in the change of one or more parameters on the network security device. As parameters are gathered from the designated mimic device (block 402), they are compared with a previously gathered set of parameters to determine if any changes to the parameters have occurred (block 404).

Where no parameter change has occurred since the last time parameters were gathered (block 404), it is determined whether it is time to re-gather the parameters of the designated mimic device (block 406). The parameters are re-gathered from the designated mimic device upon expiration of a parameter update period (block 406). This parameter update period is this discussed above in relation to element 208 of FIG. 2 and may be either user programmable or fixed as a defined period depending upon the particular embodiment. Once the parameter update period has expired (block 406), the processes beginning at block 402 are repeated.

Alternatively, where a parameter change has occurred since the last time parameters were gathered (block 404), a parameter delay is accessed (block 408). The parameter delay is that discussed above in relation to element 206 of FIG. 2. An update of the parameters of the bait network device is scheduled to occur in the future after expiration of the parameter delay (block 410). As such, an update to the bait network device is delayed for a defined period (i.e., the parameter delay) after the change is identified in the designated mimic device. Thus, for example, a security flaw that is corrected in the designated mimic device will be similarly corrected in the bait network device, but only after a delay period corresponding to the parameter delay plus any time delay between when the change was made in the designated mimic device and when the parameters are re-gathered by the bait network device. This delayed change in the bait network device allows the bait network device to continue exhibiting a known security flaw for a period, but correct the known security flaw after some time to avoid use of temporal correlation by a malicious actor to identify the bait network device as anything other than a real production environment.

Figure 5:
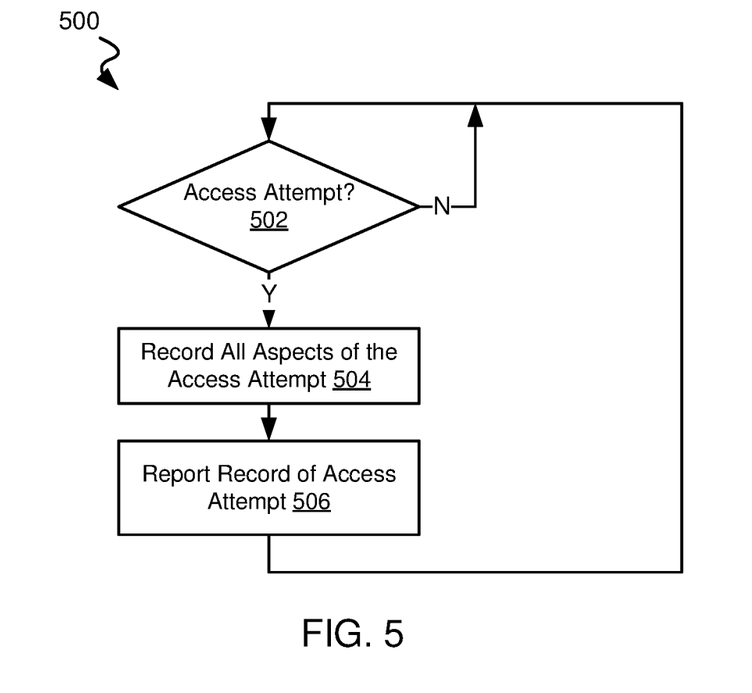
FIG. 5 shows a method in accordance with some embodiments for monitoring attempts to access a bait device.

Turning to FIG. 5, a flow diagram 500 shows a method in accordance with some embodiments for monitoring attempts to access a bait device. Following flow diagram 500, it is determined whether an attempt to access a bait network device has occurred (block 502). As the bait network device is not a real production environment that would be know to and used by legitimate users, a significant percentage of accesses by malicious actors to the bait network device would be expected. As such, recording data about attempted accesses to the bait network device can provide valuable information exposing malicious actors and their behaviors. Where an access attempt is detected (block 502), all aspects of the attempted access are recorded (block 504) and reported to a party responsible for evaluating the attempted accesses (block 506).

Figure 6:
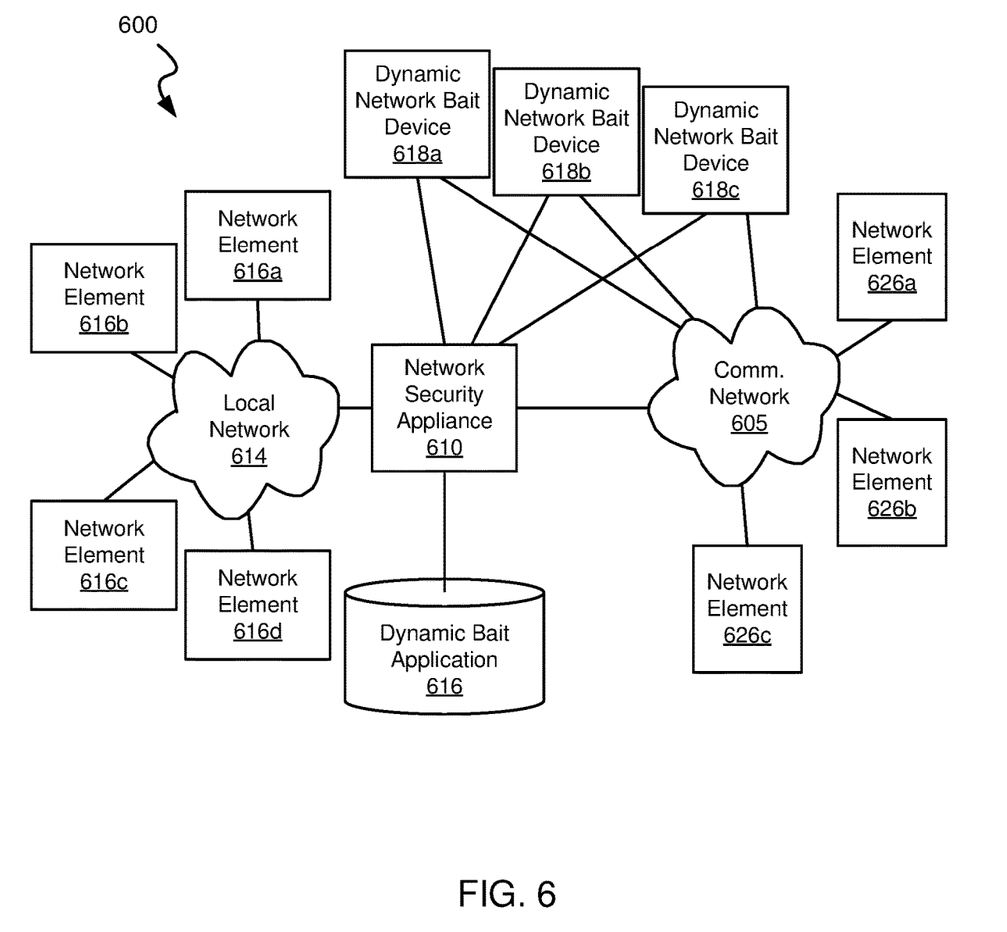
FIG. 6 illustrates a network architecture including multiple dynamic network bait devices controlled by a network security appliance operating as a bait device controller in accordance with various embodiments.

Turning to FIG. 6, a network architecture 600 is shown that includes multiple dynamic network bait devices 618 (i.e., dynamic network bait device 618a, dynamic network bait device 618b, and dynamic network bait device 618c) controlled by a network security appliance 610 operating as a bait device controller in accordance with various embodiments. In the context of network architecture 600, a number of network elements (e.g., a network element 616a, a network element 616b, a network element 616c, a network element 616d, a network element 626a, a network element 626b, and a network element 626c) are coupled to respective networks (e.g., a local network 614 and a communication network 605). Local network 614 and communication network 605 may respectively be any type of communication network known in the art. Those skilled in the art will appreciate that, local network 614 and/or communication network 605 can be wireless network, a wired network, or a combination thereof that can be implemented as one of the various types of networks, such as an Intranet, a Local Area Network (LAN), a Wide Area Network (WAN), an Internet, and the like. Further, local network 614 can either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like.

Access to local network 614 is controlled by a network security appliance 610. Network security appliance 610. Thus, other network elements 626 are capable of accessing local network 614 via network security appliance 610.

Each of dynamic network bait devices 618 are configured to generate network traffic onto communication network 605 that looks similar to the network traffic generated by network security appliance 610. However, access to local network 614 is not accessible via any of dynamic network bait devices 618. As such, each of dynamic network bait devices 618 operate to attract potentially expose malicious actors monitoring communication network 605 and attempting to access network devices without authorization. Operation of dynamic network bait device 618 is controlled by network security appliance 110 executing a dynamic bait application 612. In some embodiments, one or more of dynamic network bait devices 618 is/are implemented as a virtual machine on network security appliance 610. In other embodiments, one or more of dynamic network bait devices 618 is/are stand-alone computers that are provided information about network security appliance 610. Based upon the disclosure provided herein, one of ordinary skill in the art will recognize a variety of possible deployments of a dynamic network bait device in relation to a network architecture that may be used in relation to different embodiments.

In network architecture 600, network security appliance 610 operates as a central controller that can be managed by a network administrator to define macro settings that cause one or more dynamic network bait devices 618 to be instantiated and removed, and each of dynamic network bait devices 618 operate with variations to each other such that while each mimic the operation of network security appliance 610, the variance causes them to appear to be different network devices.

In conclusion, the present disclosure provides for novel systems, devices, and methods. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A method for automatically modifying a bait network device, the method comprising:
    monitoring, by a processing resource, network traffic associated with a designated network device;
    determining, by the processing resource, that a first parameter has changed on the designated network device;
    scheduling, by the processing resource, a change in a second parameter on the bait network device after a delay period;
    changing, by the processing resource, the second parameter to match the change in the first parameter based upon expiration of the delay period;
    identifying, by the processing resource, a set of network traffic features in the network traffic associated with the designated network device;
    generating, by the processing resource, a set of network traffic instances and a corresponding schedule defining times for each of the network traffic instances in the set of network traffic instances based at least in part on the designated network device; and
    generating, by the processing resource, network traffic for the bait network device as defined by the set of network traffic instances and the corresponding schedule.

2. The method of claim 1, wherein the network traffic associated with the designated network device is a first network traffic associated with the designated network device, wherein the set of network traffic features in the network traffic associated with the designated network device, wherein the set of network traffic instances and the corresponding schedule is a first set of network traffic instances and a first corresponding schedule, the method further comprising:
    monitoring, by the processing resource, a second network traffic associated with the designated network device;
    identifying, by the processing resource, a second network traffic features in the second network traffic associated with the designated network device;
    generating, by the processing resource, a second set of network traffic instances and a second corresponding schedule defining times for each of the network traffic instances in the second set of network traffic instances based at least in part on the designated network device; and
    generating, by the processing resource, network traffic as defined by the second set of network traffic instances and the second corresponding schedule.

3. The method of claim 2, wherein the second network traffic occurs during a time period after a time period during which the first network traffic occurred.

4. The method of claim 1, wherein the first parameter is changed because of a security update on the designated network device.

5. The method of claim 4, wherein a security flaw in the bait network device remains for at least the delay period after the security flaw is corrected in the designated network device.

6. The method of claim 1, wherein the delay period is user programmable.

7. The method of claim 1, wherein the processing resource includes a first processor and a second processor, and wherein:
    the monitoring network traffic is done by the first processor;
    the identifying the set of network traffic features in the network traffic associated with the designated network device is done by the first processor;
    the generating the set of network traffic instances and the corresponding schedule is done by the first processor; and
    the generating the network traffic is done by the second processor.

8. The method of claim 1, wherein the designated network device is a network security appliance.

9. The method of claim 1, wherein the bait network device is a virtual machine running on the designated network device.

10. A system for automatically modifying operation of a bait network device, the system comprising:
    a processing resource;
    a non-transient computer readable medium coupled to the processing resource and having stored therein instructions that when executed by the processing resource cause the processing resource to:
    monitor network traffic associated with a designated network device;
    determine that a first parameter has changed on the designated network device;
    schedule a change in a second parameter on the bait network device after a delay period;
    change the second parameter to match the change in the first parameter based upon expiration of the delay period;
    identify a set of network traffic features in the network traffic associated with the designated network device;
    generate a set of network traffic instances and a corresponding schedule defining times for each of the network traffic instances in the set of network traffic instances based at least in part on the designated network device; and
    generate network traffic for the bait network device as defined by the set of network traffic instances and the corresponding schedule.

11. The system of claim 10, wherein the network traffic associated with the designated network device is a first network traffic associated with the designated network device, wherein the set of network traffic features in the network traffic associated with the designated network device, wherein the set of network traffic instances and the corresponding schedule is a first set of network traffic instances and a first corresponding schedule, and wherein the non-transient computer readable medium further includes instructions that when executed by the processing resource cause the processing resource to:
    monitor a second network traffic associated with the designated network device;
    identify a second network traffic features in the second network traffic associated with the designated network device;

generate a second set of network traffic instances and a second corresponding schedule defining times for each of the network traffic instances in the second set of network traffic instances based at least in part on the designated network device; and generate network traffic as defined by the second set of network traffic instances and the second corresponding schedule.

12. The system of claim 11, wherein the second network traffic occurs during a time period after a time period during which the first network traffic occurred.

13. The system of claim 10, wherein the first parameter is changed because of a security update on the designated network device.

14. The system of claim 13, wherein a security flaw in the bait network device remains for at least the delay period after the security flaw is corrected in the designated network device.

15. The system of claim 10, wherein the processing resource includes a first processor and a second processor, and wherein:

the monitoring network traffic is done by the first processor;

the identifying the set of network traffic features in the network traffic associated with the designated network device is done by the first processor;

the generating the set of network traffic instances and the corresponding schedule is done by the first processor; and the generating the network traffic is done by the second processor.

16. The method of claim 10, wherein the designated network device is a network security appliance.

17. The method of claim 10, wherein the bait network device is a virtual machine running on the designated network device.

18. A non-transient computer readable medium having stored therein instructions that when executed by the processing resource cause the processing resource to:

monitor a first network traffic associated with a designated network device, wherein the first network traffic occurs during a first period;

identify a first set of network traffic features in the first network traffic associated with the designated network device;

generate a first set of network traffic instances and a first corresponding schedule defining times for each of the first network traffic instances in the first set of network traffic instances;

monitor a second network traffic associated with the designated network device, wherein the second network traffic occurs during a second period;

identify a second network traffic features in the second network traffic associated with the designated network device;

generate a second set of network traffic instances and a second corresponding schedule defining times for each of the network traffic instances in the second set of network traffic instances based at least in part on the designated network device;

generate, during a third period, network traffic as defined by the first set of network traffic instances and the first corresponding schedule; and generate, during a fourth period, network traffic as defined by the second set of network traffic instances and the second corresponding schedule.

19. The non-transient computer readable medium of claim 17, wherein the second period is after the first period, and wherein the fourth period is after the third period.

* * * * *